United States Patent [19]

Baik

[11] Patent Number: 5,793,027
[45] Date of Patent: Aug. 11, 1998

[54] IC CARD FOR CREDIT TRANSACTIONS AND CREDIT TRANSACTION APPARATUS AND METHOD USING THE SAME

[75] Inventor: In-Seong Baik, Anyang, Rep. of Korea

[73] Assignee: SamSung Electronics Co., Ltd., Kyungki-do, Rep. of Korea

[21] Appl. No.: 573,938

[22] Filed: Dec. 18, 1995

[30] Foreign Application Priority Data

Dec. 19, 1994 [KR] Rep. of Korea .................. 1994 35072

[51] Int. Cl.$^6$ .............................. G06K 5/00; G06F 17/60
[52] U.S. Cl. .................................... 235/380; 235/379
[58] Field of Search .................................. 235/379, 360, 235/375, 492; 340/825.31, 825.34, 825.35

[56] References Cited

U.S. PATENT DOCUMENTS

| | | | |
|---|---|---|---|
| 4,001,550 | 1/1977 | Schatz | 235/617 |
| 4,105,156 | 8/1978 | Dethloff | 235/441 |
| 4,614,861 | 9/1986 | Pavlov et al. | 235/380 |
| 4,634,845 | 1/1987 | Hale et al. | 235/380 |
| 4,683,372 | 7/1987 | Matsumoto | 235/432 |
| 4,736,094 | 4/1988 | Yoshida | 235/379 |
| 4,804,825 | 2/1989 | Bitoh | 235/380 |
| 4,812,628 | 3/1989 | Boston et al. | 235/380 |
| 4,822,985 | 4/1989 | Boggan et al. | 235/380 |
| 4,908,521 | 3/1990 | Boggan et al. | 235/380 |
| 4,961,142 | 10/1990 | Elliot et al. | 235/360 |
| 4,973,826 | 11/1990 | Naruse et al. | 235/380 |
| 4,995,081 | 2/1991 | Leighton et al. | 235/382 |
| 5,177,342 | 1/1993 | Adams | 235/379 |
| 5,227,612 | 7/1993 | Le Roux | 235/379 |
| 5,365,045 | 11/1994 | Iijima | 235/380 |

*Primary Examiner*—Donald T. Hajec
*Assistant Examiner*—Le Then Minh
*Attorney, Agent, or Firm*—Robert E. Bushnell, Esq

[57] ABSTRACT

An IC card for credit transactions and a credit transactions apparatus and method using the IC card are provided. In an IC card for credit transactions includes a data memory portion and a controlling portion for reading out or recording data in the data memory portion, the data memory portion includes a user information area for recording information on the identification of a user, a transaction limit information area for recording information on the off-line transaction limit of the user, and a transaction particulars information area being divided into a plurality of sub-areas and for recording information on the transaction particulars of the user. Transactions using the credit card within the usage limit range set according to the credit rating of a customer are processed off-line, so as to reduce not only the load applied to the host system of the credit card company caused by the on-line transaction but also the time delay by the transaction approval, while minimizing losses (due to non-payment) of a credit card company and retail outlets caused by off-line usage by additionally recording special information on the IC card, such as delinquent payments, to restrict off-line credit transactions.

16 Claims, 2 Drawing Sheets

FIG. 1

| | |
|---|---|
| 11 — USER INFORMATION | |
| 13 — LOCK INFORMATION | |
| 15 — LUMP-SUM LIMIT AMOUNT | — 151 |
| INSTALLMENT LIMIT AMOUNT | — 152 |
| TOTAL LIMIT AMOUNT | — 153 |
| USAGE LIMIT FREQUENCY | — 154 |
| 17 — FIRST OFFSET INFORMATION | — 171 |
| SECOND OFFSET INFORMATION | — 172 |
| TAG | — 191 |
| TRANSACTION NUMBER | — 192 |
| TRANSACTION DATE | — 193 |
| TRANSACTION TIME | — 194 |
| 19 — RETAILER'S CODE | — 195 |
| RETAILER'S ABBREVIATION | — 196 |
| APPROVAL NUMBER | — 197 |
| NUMBER OF INSTALLMENT MONTHS | — 198 |
| TRANSACTION AMOUNT | — 199 |

IC CARD FOR CREDIT TRANSACTIONS AND CREDIT TRANSACTION APPARATUS AND METHOD USING THE SAME

CROSS REFERENCE TO RELATED APPLICATIONS

This application makes reference to, incorporates the same herein, and claims all benefits accruing under 35 U.S.C§119 from an application entitled *IC Card For Credit Transactions And Credit Transaction Apparatus And Method Using The Same* earlier filed in the Korean Industrial Property Office on 19 Dec. 1994, which was duly assigned Ser. No. 35072/1994 by that Office.

BACKGROUND OF THE INVENTION

The present invention relates to an IC card for credit transactions and a credit transaction apparatus and a method using the same, and more particularly, to a credit transaction card and apparatus employing an IC card and a method therefor using an on-line or off-line system.

Magnetic strip cards are cards of a plastic or paper medium having a magnetic recording medium attached thereto; an example of the former being a bank cash card or credit card, and an example of the latter being a prepaid coupon-type card such as phone card or subway token.

As an alternative to the magnetic strip card, there is an IC card having an integrated circuit chip installed in a card medium provided with components such as a display and battery. An IC card (or "smart" card) comprises a RAM, a ROM, a central processing unit, and a nonvolatile memory for storing such information as card-issuer and card-user data.

For credit purchases, transactions are first approved in an on-line manner by a host computer of the credit card company or bank. The transaction is recorded on a credit card voucher, with the retailer and the user (purchaser) each retaining a copy. Thereafter, the retailer submits the voucher to the bank, requesting payment, and sends the user a (monthly) statement saying that the money was automatically paid from the user's account.

However, the user often cannot remember every transaction and is thus burdened to save all the transaction slips. Also, obtaining on-line credit approval is time-consuming, causing a delay in credit purchases.

SUMMARY OF THE INVENTION

To solve the above problems, it is an object of the present invention to provide an IC card for credit transactions which can make a deal on credit not only on-line but also off-line with a host system in a credit card company by using an IC card provided with a data recording and reading out function.

It is another object of the present invention to provide an IC card for credit transactions which can make a deal on credit, selectively on-line or off-line with a host system according to the credit of an IC card user, by using an IC card provided with a data recording and reading out function for credit transactions.

It is still another object of the present invention to provide an apparatus for on-line and off-line credit transactions with a host system, by using an IC card provided with a data recording and reading out function for credit transactions.

It is still yet another object of the present invention to provide a method for on-line and off-line credit transactions with a host system, by using an IC card provided with a data recording and reading out function for credit transactions.

Accordingly, to achieve the first object, there is provided an IC card for credit transactions including a data memory portion and a controlling portion for reading out or recording data in the data memory portion, wherein the data memory portion comprises: a user information area for recording information on the identification of a user; a transaction limit information area for recording information regarding a user's off-line transaction limit; and a transaction particulars information area, divided into a plurality of sub-areas, for recording information on the particulars of a credit transaction.

To achieve the second object, there is provided an IC card for credit transactions including a data memory portion and a controlling portion for reading out or recording data in the data memory portion, wherein the data memory portion comprises: a user information area for recording information on the identification of a user; a transaction particulars information area, divided into a plurality of sub-areas, for recording information on the particulars of a transaction; and a usage restriction information area for recording restriction information according to the user's credit rating.

To achieve the third object, there is provided an apparatus for credit transactions comprising: an IC card for recording and reading out information regarding a user's credit transaction limit and particulars on a credit transaction; a terminal processing unit installed at a retail outlet where credit transactions by use of the IC card are available for selectively performing on-line and off-line transactions according to a transaction limit read-out from the IC card and for recording information on the performed credit transaction particulars in the terminal processing unit and in the IC card; and a central processing unit installed at a credit card company which manages the credit transactions by the IC card and is connected to the terminal processing unit for on-line processing the credit transactions by use of the IC card according to an on-line transaction request by the terminal processing unit and managing the transaction particulars information processed in the terminal processing unit.

To achieve the fourth object, there is provided a method for credit transactions by using an IC card for credit transactions which can record and read out information on credit transaction limit and credit transactions particulars, the method comprises the steps of: performing a credit transaction by using the IC card at a member store; confirming a transaction limit recorded in the IC card, by which the transaction made at the member store is processed off-line when the credit transaction particulars are within the transaction limit, or by which the transaction made at the member store is processed on-line when the credit transaction particulars are not within the transaction limit; confirming a transaction restriction, by which the transaction made at the member store is processed on-line when transaction limit information for preventing an off-line transaction is recorded in the user's IC card, or off-line when the transaction limit information for preventing an off-line transaction is not recorded in the user's IC card; processing the credit transaction on-line or off-line according to the processing method determined in the transaction limit confirmation step and transaction restriction confirmation step; recording information on the processed transaction particulars in IC card and in the member store; and transmitting the information on the processed particulars recorded in the member store collectively to a credit card company by an on-line method.

BRIEF DESCRIPTION OF THE DRAWINGS

A more complete appreciation of the present invention, and many of the attendant advantages thereof, will become

Figure 2:
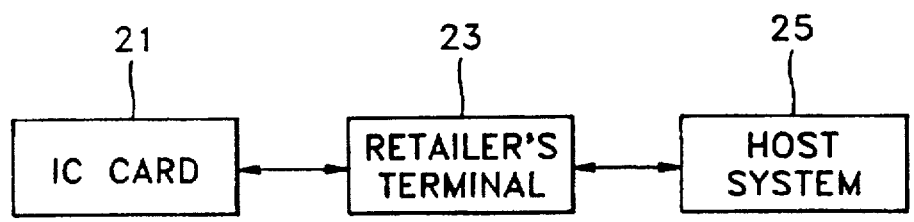
Figure 3:
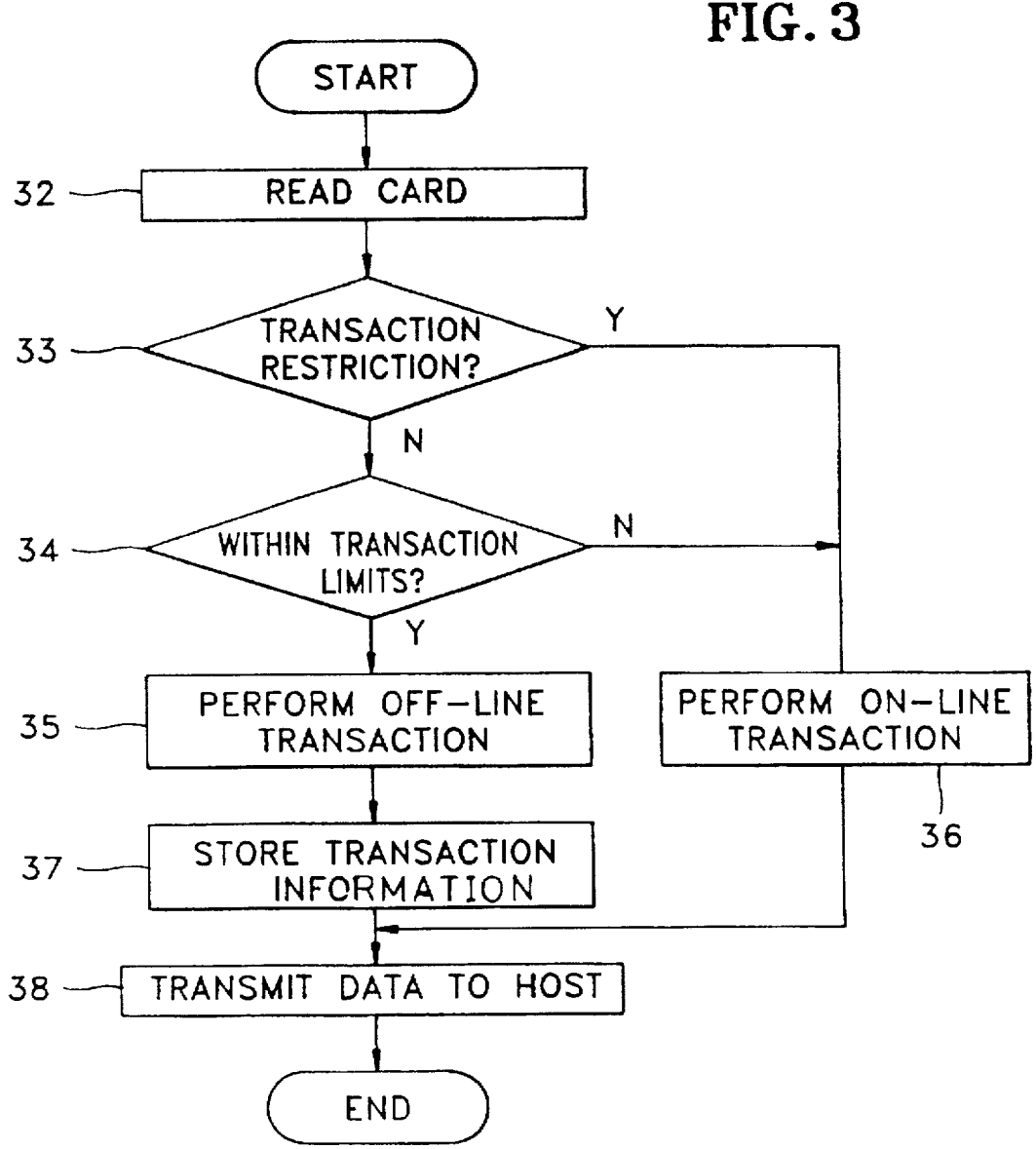

3 readily apparent as the same becomes better understood by reference to the following detailed description when considered in conjunction with the accompanying drawings in which like reference symbols indicate the same or similar components, wherein:

FIG. 1 illustrates the information format stored in the data memory portion of the IC card for credit transactions, according to the principles of the present invention;

FIG. 2 is a block diagram illustrating the configuration of an IC card apparatus according to the principles of the present invention; and FIG. 3 is a flowchart showing a method for processing credit transactions using an IC card, according to the principles of the present invention.

DETAILED DESCRIPTION OF THE INVENTION

Referring to FIG. 1, a data memory portion of an IC card is composed of a 37-byte user information area 11, a 1-byte lock information area 13, a 13-byte transactions limitation information area 15, a 2-byte offset information area 17, and a 30-byte transaction particulars information area 19.

User information area 11 contains general information about the card user, including name, address and an identifying number, i.e., personal identification number (PIN) used for security purposes.

Lock information area 13 contains information regarding a user's credit transaction limits, together with lock information composed of temporary lock, lock release and permanent lock information, so that credit card transactions of a user having poor credit can be restricted according to the type of transaction attempted. Here, the temporary lock information, which can be set/released when a user (transactor) has unacceptably poor credit, restricts off-line transactions but not on-line transactions, while the permanent lock information restricts all types of transaction by preventing the IC card from being used or by deleting the card information entirely.

Transaction limit information area 15 is for preset transaction limits according to a card user's credit rating and according to certain transaction results. The transaction limit information includes a lump-sum payment limit amount 151, an installment limit amount 152, a total limit amount 153 and a usage frequency limit 154. Also, the information is useful in determining whether a credit transaction can currently be performed using the IC card and whether it is to be processed on-line or off-line.

Credit transactions can be conducted according to whether payment of the credit amount is to be paid all at once, i.e., a lump-sum payment, or whether payment of the credited amount is to be made by a series of payments, i.e., installment payments. Accordingly, lump-sum limit amount 151 is information setting a transaction limit amount which corresponds to a lump-sum payment amount which is to be paid during a predetermined period (usually one month), and is recorded as binary-coded decimal (BCD) data. Installment limit amount 152 is information setting a transaction limit amount corresponding to installment payment amounts to be paid periodically, and is recorded as data of the BCD form. Total limit amount 153 is information setting a total credit amount, i.e., total credit limit, which is not to be exceeded by a lump-sum limit amount, an installment limit amount or a combination thereof for off-line transactions during a predetermined period, and is recorded as BCD data. Usage frequency limit 154 is information setting a usage frequency of continual transactions capable of being performed off-

4 line, i.e., the number of off-line transactions permitted before requiring the IC card to be in on-line communication with the host credit card company, and is recorded as ASCII data.

Transaction particulars information area 19 is provided with a plurality of information areas containing tag information 191, transaction number information 192, transaction date information 193, transaction time information 194, retailer code information 195, retailer abbreviation information 196, approval number information 197, number of installment months information 198 and transaction amount information 199. Accordingly, corresponding information about the various particulars of each credit transaction is recorded in each respective area.

Tag information 191, recorded as ASCII data, includes information about the existence of an on-line transmission of information about a corresponding transaction's particulars, the existence of an approval of a corresponding transaction for an on-line transaction, the existence of a cancellation of a corresponding transaction, and facts about whether the corresponding transaction is an on-line transaction or an off-line transaction.

Transaction number 192 is a serial number of the relevant transaction. Transaction date 193, transaction time 194, retailer code 195 and retailer abbreviation 196 are information about the date and time of the relevant transaction, and information about the retailer where the relevant transaction took place. Transaction number 192, transaction date 193, transaction time 194 and member store code 195 are each expressed as BCD data. The retailer abbreviation 196 is expressed as ASCII data. Number of installment months 198 is information pertaining to the number of monthly installments in which the amount of the transaction is to be paid. Transaction amount 199 is information on the amount of the relevant transaction.

In offset information area 17 is information used for the selection of one area of transaction particulars information area 19 among a plurality of information sub-areas where transaction particulars information is stored and includes first offset information 171 used for the recording of the transaction particulars and second offset information 172 for the read-out of transaction particulars.

Here, first offset information 171 is for the selection of the area where the transaction particulars, during a current transaction, are to be recorded among the plurality information areas of transaction particulars information area 19, when the transaction particulars are recorded in the IC card during the transaction. That is, first offset information 171 is an offset address value indicating a next memory area in which transaction particulars is to be recorded in the IC card. Second offset information 172 is for the selection of the area where read-out is to start among the plurality of information areas of transaction particulars information area 19 during a request of the transaction particulars stored in the IC card. That is, second offset information 172 is an address for pointing out memory areas from which transaction particulars are read out so that the next successive set of transaction particulars stored in memory can be read out and transferred to the host. The first and second offset information 171 and 172 are expressed as hexadecimal data.

Regarding the transaction particulars, and more specifically, the tag information about the existence of an on-line transmission of information about relevant transaction particulars refers to information indicating that the transaction particulars for a particular credit transaction have been sent on-line to the host system. Accordingly, when the IC card is on-line with the host system in order to transmit all the credit transactions performed within a predetermined time period, it becomes unnecessary to transmit the transaction particulars of those credit transactions when corresponding tag information indicates that the corresponding credit transaction particulars have already been sent to the host system. This avoids an unnecessary redundancy in transmitting data to the host thereby reducing the time necessary to transmit data to the host system from the IC card. Also, since transaction particulars information can be overwritten by a recycling of address data in response to the first offset address data, thus obviating any need for an erase or delete command to be supplied to the IC card, data in a corresponding memory area will not be overwritten unless the tag information indicates that the corresponding transaction particulars have bee transmitted on-line to the host system. Further, since there is no erase command of delete command supplied to the IC card, then information in the tag area indicating whether a particular transaction was cancelled is necessary so that the user will not be billed for a transaction that was cancelled.

FIG. 2 shows the configuration of the apparatus for processing credit transactions using the IC card according to the principles of the present invention. For credit transactions, the processing apparatus is composed of an IC card 21 containing the information described in FIG. 1, a terminal 23 installed in each credit card member store, and a host system 25 installed at a credit card company.

Terminal 23 is installed in each member store, where credit transactions using IC card 21 are made, and is connected to host system 25. The terminal processes, by selecting on-line or off-line with the host system, the credit transactions according to the information read out from IC card 21 of a user, during the credit transaction using the IC card.

The information about the transaction particulars processed in terminal 23 is recorded in a memory in terminal 23 and a memory, i.e., transaction particulars information area 19, of IC card 21, respectively. Terminal 23 collectively transmits, on-line, the stored data related to the transactions to host system 25. When an on-line transaction using IC card 21 is made, the information about the transaction particulars stored in the card is transmitted to host system 25 and the existence of that transmission is recorded in tag area 191.

Host system 25 is installed in the credit card company which manages the credit transaction using IC card 21 and is connected to each terminal 23 of each member store. Host system 25 stores information about all card users and credit transactions and stores information about the transaction particulars transmitted from terminal 23. When an on-line transaction is requested from terminal 23, the host system processes the credit transaction using IC card 21 as an on-line approved transaction.

FIG. 3 is a flowchart showing the processing method of the credit transaction using the IC card of the present invention, in which an IC card bearing all the user's information (as in FIG. 1) is first issued to a user and whereon information about the transaction particulars can be recorded.

In step 32, when the card user initiates a credit transaction using IC card 21 by inserting the card into terminal 23 and inputting the user's personal identification number (PIN), the user information recorded on the card is read by terminal 23, so that information stored in the card's memory areas 11, 13 and 15 (FIG. 1) can be read by terminal 23. Note that in step 23 a comparison between the input PIN with the personal identification number stored in user information area 11 is made. Then determinations are made regarding the type of credit transaction which is permitted according to the data stored in the card's memory areas 13 and 15.

In step 33, it is determined whether there is a preset lock data stored in lock information area 13, and when no lock information is read from lock information area 13, information in transaction limitation information area 15 is analyzed, step 34, to determine whether the transaction is within preset transaction limits. These limits are based on the amount of the credit transaction as compared to one of limit amounts 151, 152 and 153 and whether the current transaction in combination with previous transactions exceeds usage limit frequency 154. When it is determined that the limits are not exceeded by the current transaction then terminal 23 is permitted to perform the credit transaction off-line in step 35.

On the other hand, when step 33 determines that temporary lock information is recorded in lock information area 13, or when step 34 determines that the transaction is not within preset transaction limits, terminal 23 must establish communication with host 25 so that the credit transaction can be performed on-line, step 36. Note that when step 33 determines permanent lock information (step not shown) is recorded in lock information area 13, neither on-line nor off-line transactions can be processed.

In step 37, transaction particulars of the current off-line transaction are stored in IC card 21 and in a memory area of terminal 23. Data recorded in terminal 23 is transmitted to host 38 at a later time, or periodically, in an on-line manner in step 38. Following the establishment of on-line communication with the host in step 36, transaction particulars of the current on-line transaction are transmitted in step 38 to host 38.

As described above, the present invention processes the transaction off-line between IC card 21 and terminal 23 when the transaction particulars are within the usage limit range set according to the credit rating of a customer, in order to reduce not only the load applied to host system 23 of the credit card company caused by the on-line transaction but also to reduce the time delay caused by waiting for transaction approval. Also, revenue losses (due to nonpayment) of the credit card company and retail outlets caused by off-line usage can be minimized by additionally recording special information, such as lock information and transaction limit amounts, on the IC card, due to delinquent payments of the user, in order to restrict off-line credit transactions.

While there have been illustrated and described what is to be considered to be the preferred embodiment of the present invention, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An IC card for credit transactions comprising:
   a data memory portion; and
   a controlling portion for reading out or recording data in said data memory portion, said data memory portion comprising:
   a user information area for recording information regarding identification of a user;

a transaction limit information area for recording information corresponding to any one of a plurality of off-line credit transaction limits; and a transaction particulars information area divided into a plurality of subareas for recording information on the transaction particulars, said transaction particulars information comprising:

tag information which indicates whether corresponding transaction information has been transmitted on-line to a host computer, whether the corresponding transaction was performed based on on-line approval from the host computer, whether the corresponding transaction was cancelled and whether the corresponding transaction was performed on-line or off-line.

2. An IC card for credit transactions as set forth in claim 1, wherein said information corresponding to said plurality of off-line credit transaction limits comprises any one of:

a lump sum limit amount corresponding to a lump sum payment to be made within a predetermined period of time;

an installment limit amount corresponding to installment payments to be made periodically over time;

a total credit limit amount corresponding to a limit amount not to be exceeded by a summation of lump-sum credit amounts and installment credit amounts transacted over said predetermined period of time; and a frequency of usage limit amount establishing a predetermined number of credit transactions which can be performed over a set time period.

3. An IC card for credit transactions as set forth in claim 1, said data memory portion further comprises:

an offset information area for storing offset address data changing a current address of one subarea to a next successive address for addressing a next subarea of said plurality of the subareas.

4. An IC card for credit transactions as set forth in claim 3, wherein said offset address data comprises:

first offset information for selecting a next one of said subareas in said transaction particulars information area in which transaction particulars are to be recorded; and second offset information for selecting a next one of said subareas in said transaction particulars information area for reading out recorded transaction particulars.

5. An IC card for credit transactions having a data memory portion, said data memory portion comprising:

a first memory area for storing information on a user's identity;

a second memory area for storing transaction particulars of said credit transaction, said second memory area being divided into a plurality of subareas, one of said subareas comprising:

tag information which indicates whether said credit transaction information has been transmitted on-line to a host computer, whether said credit transaction was performed based on on-line approval from the host computer, whether the credit transaction was cancelled and whether the credit transaction was performed on-line or off-line; and a third memory area for storing restriction information for placing limits on use of said IC card to limit particular credit transactions according to the user's credit rating.

6. An IC card for credit transactions as set forth in claim 5, wherein said restriction information comprises any one of a temporary lock information for preventing an off-line credit transaction and a permanent lock information for preventing use of said IC card.

7. An apparatus comprising an IC card for conducting a credit transaction, said IC card having a data memory portion, said data memory portion comprising:

a user information area for recording information regarding identification of a user;

a transaction limit information area for recording information corresponding to any one of a plurality of off-line credit transaction limits, said transaction limit information area being divided into a plurality of subareas comprising:

a first subarea for storing a lump sum limit amount corresponding to a lump sum payment to be made within a predetermined period of time;

a second subarea for storing an installment limit amount corresponding to installment payments to be made periodically over time;

a third subarea for storing a total credit limit amount corresponding to a limit amount not to be exceeded by a summation of lump-sum credit amounts and installment credit amounts transacted over said predetermined period of time; and a fourth subarea for storing a frequency of usage limit amount establishing a predetermined number of credit transactions which can be performed over a set time period; and a transaction particulars information area for recording information on the transaction particulars.

8. The apparatus as set forth in claim 7, further comprising:

a retailer's terminal in which said IC card is inserted for conducting said credit transaction.

9. The apparatus as set forth in claim 8, further comprising a host terminal disposed within a financial institution, said host terminal being connectable on-line with said retailer's terminal.

10. The apparatus as set forth in claim 9, further comprising:

said retailer's terminal being enabled to read said IC card when said user inserts said IC card into said retailer's terminal;

said retailer's terminal being enabled to conduct said credit transaction when a user's personal identification number stored in said user information area matches a number manually input by said user into said retailer's terminal;

said retailer's terminal determining whether data stored in a lock information area of said data memory portion is indicative of any one of permitting an off-line credit transaction, permitting an on-line credit transaction and not permitting any credit transaction;

said retailer's terminal determining whether a current transaction is within at least one of said off-line credit transaction limits stored in said transaction limit information area when said data stored in a lock information area of said data memory portion is indicative of permitting an off-line credit transaction;

said retailer's terminal performing said current transaction off-line when said current transaction is within said at least one of said off-line credit transaction limits;

said retailer's terminal storing transaction particulars of said current transaction in an internal memory of said retailer's terminal and in said transaction particulars information area of said memory portion of said IC card; and said retailer's terminal transmitting said transaction particulars stored in said internal memory to said host terminal on a periodic basis.

11. The apparatus as set forth in claim 10, further comprising:

said retailer's terminal establishing said on-line connection with said host terminal when said data stored in a lock information area of said data memory portion is indicative of permitting only an on-line credit transaction;

said retailer's terminal performing said current transaction when said host terminal authorizes said current transaction; and said retailer's terminal transmitting said transaction particulars to said host terminal during said on-line connection.

12. The apparatus as set forth in claim 10, further comprising:

said retailer's terminal establishing said on-line connection with said host terminal when said current transaction is determined not to be within said at least one of said off-line credit transaction limits;

said retailer's terminal performing said current transaction when said host terminal authorizes said current transaction; and said retailer's terminal transmitting said transaction particulars to said host terminal during said on-line connection.

13. An method for conducting a credit transaction in a system using an IC card, said IC card having a data memory portion, said method comprising the steps of:

reading information stored in said data memory portion of said IC card;

determining whether said information includes data preventing said IC card from being used to conduct said credit transaction off-line;

determining whether said credit transaction is within a preset transaction limit, said preset transaction limit being any one of lump-sum limit amount, an installment limit amount, a total credit limit amount and a usage limit frequency, when said information does not include data preventing said IC card from being used to conduct said credit transaction off-line;

performing said credit transaction off-line when said credit transaction is within said preset transaction limit.

14. The method as set forth in claim 13 further comprising the step of:

storing transaction particulars of said credit transaction performed off-line into said data memory portion of said IC card.

15. The method as set forth in claim 13, further comprising the steps of:

performing said credit transaction on-line when said information includes data preventing said IC card from being used to conduct said credit transaction off-line.

16. The method as set forth in claim 13, further comprising the steps of:

performing said credit transaction on-line when said credit transaction is not within said preset transaction limit.

* * * * *